United States Patent

Romanowski

Patent Number: 5,811,359
Date of Patent: *Sep. 22, 1998

[54] FIRE-RETARDANT BARRIER STRUCTURE

[76] Inventor: John C. Romanowski, 5 Spring Rd., Londonderry, N.H. 03053

[*] Notice: The term of this patent shall not extend beyond the expiration date of Pat. No. 4,975,316.

[21] Appl. No.: 299,537

[22] Filed: Sep. 1, 1994

Related U.S. Application Data

[63] Continuation-in-part of Ser. No. 621,369, Nov. 30, 1990, Pat. No. 5,344,697, which is a continuation-in-part of Ser. No. 324,098, Mar. 6, 1989, Pat. No. 4,975,316.

[51] Int. Cl.$^6$ ........................................................ B32B 7/00
[52] U.S. Cl. ........................... 442/261; 442/255; 428/36.1; 428/36.2; 428/36.3; 428/36.4; 428/36.5; 428/36.6; 428/36.7
[58] Field of Search ........................... 428/36.1, 36.2, 428/36.3, 36.4, 36.5, 36.6, 36.7; 442/255, 261

[56] References Cited

U.S. PATENT DOCUMENTS

| | | | |
|---|---|---|---|
| 4,623,594 | 11/1986 | Keough | 428/500 |
| 4,865,903 | 9/1989 | Adiletta | 428/215 |
| 4,924,525 | 5/1990 | Bartacis . | |
| 4,970,105 | 11/1990 | Smith, Jr. | 428/198 |
| 4,975,316 | 12/1990 | Romanowski | 428/247 |
| 5,002,795 | 3/1991 | Keough | 427/44 |
| 5,082,721 | 1/1992 | Smith, Jr. et al. | 428/252 |
| 5,162,148 | 11/1992 | Boye et al. | 428/287 |
| 5,223,553 | 6/1993 | Keough | 522/78 |
| 5,250,350 | 10/1993 | Tung | 428/216 |

OTHER PUBLICATIONS

E.I. du Pont de Nemours and Company, Permeation Guide for DuPont Tychem Fabrics, May, 1994.
ASTM F739, Test Method for Resistance of Protective Clothing Materials to Permeation by Liquids and Gases.
Fed. Test Method Std. No. 101C, Electrostatic Properties of Materials, Oct. 8, 1982.
ASTM D257–78, D–C Resistance or Conductance of Insulating Materials.
ASTM F1001–89, Selection of Chemicals to Evaluate Protective Clothing Materials.

*Primary Examiner*—Richard Weisberger
*Attorney, Agent, or Firm*—Rines and Rines

[57] ABSTRACT

Fire-retardant barrier structures. The fire-retardant barrier structures are useful for protecting military personnel and equipment from both fire and chemical and/or biological agents. The fire-retardant barriers are multilayer structures having desirable flammability characteristics and resistance to nuclear, chemical and/or biological agents. The preferred barriers also possess favorable durability properties and are printable.

20 Claims, 1 Drawing Sheet

FIRE-RETARDANT BARRIER STRUCTURE

This application is a continuation-in-part application of Ser. No. 07/621,369 filed on Nov. 30, 1990, now U.S. Pat. No. 5,344,697 granted Sep. 6, 1994, entitled FIRE-RETARDANT BARRIER STRUCTURE, which is a continuation-in-part application of U.S. patent appl. Ser. No. 07/324,098 filed Mar. 6, 1989 now U.S. Pat. No. 4,975,316, the contents of both of which are hereby expressly incorporated by reference.

BACKGROUND OF THE INVENTION

1. Field of the Invention

This invention relates to a fire-retardant barrier structure useful for making nuclear, biological and chemical (NBC) protective materials for use in garments for personnel, tents, covers for equipment and supplies. The fire-retardant barrier may be a laminated barrier structure composed of multilayer plastic films and, in particular, to a composite, laminated-plastic fire-retardant material which includes a layer of fabric substrate.

2. Description of the Prior Art

Plastic barrier materials are involved in an almost unlimited range of products and applications. Containers, wrappers, pouches and bottles of varying degrees of flexibility for foods, pharmaceuticals, chemicals, and other products are commonplace. In addition to containing and protecting products, barrier materials are used to protect equipment and personnel from a wide range of environmental hazards. One application of such barriers having particularly stringent demands is that of protecting industry and military personnel, equipment, and supplies. Here, in addition to being fire-retardant, the material should protect against a wide range of chemical and biological agents. It should also resist penetration of chemical and biological agents in various forms, solids, liquids, gases, dust, including radioactive dust. It should be easily made resistant to deterioration from ultraviolet light when used in long term outdoor applications and be readily disposable by military and industry standards. Of course, the material should also be durable, light weight, easily fabricated and be relatively easily repaired when torn or punctured. In some instances where the barrier structure is to be used by the military in protective garments, covers, tents, shelters and equipment enclosures, it should have an outer surface in a mat finish and dull color to escape detection from the air. The outer surface should also be "printable" in that it should easily accept printed patterns such as those needed for camouflage.

Because the attainment of some of these qualities often results in the sacrifice of others, e.g. the addition of a fire-retardant additives to a material may affect its durability, there is not presently available a material which satisfies the needs of the military or the commercial, industrial markets.

One of the better known commercial films sometimes used as a barrier is a copolymer of vinylidene chloride and vinyl chloride, such as SARAN® films, available from Dow Chemical Company, Midland, Mich. This material has a high resistance to attack by a wide range of chemicals, it has low permeability to gases and vapors, and it has high transparency. Moreover, it can be bonded or sealed to itself and to many other materials and substrates for special applications. The Dow Chemical Company has made, and sold widely, combinations of SARAN® films and outer layers of polyolefin resins including low density polyethylene (LDPE) and ethylene vinyl acetate (EVA), such as SARANEX® films. The SARANEX® films in turn have been further laminated or bonded to other materials. These films are, and have been, limited to four and five layer constructions and range in the 1.5 mil to 5 mil thickness.

Other multilayer films for protective use have been disclosed. For example, Tung, in U.S. Pat. No. 5,250,350, discloses a modified burn characteristic SARANEX® film in the form of a four or five layer film product. Additionally, Boye et al., in U.S. Pat. No. 5,162,148, describe a laminated material comprising a polyolefin nonwoven substrate and a five layer coextruded film with a polyolefin outer layer and an intermediate layer selected from a group comprising ethylene-hydrolyzed vinyl acetate copolymer and polyethylene terephtalate coated with polyvinylidene chloride for manufacturing protective equipment against NBC attacks. Similarly, Smith, Jr., in U.S. Pat. Nos. 4,970,105 and 5,082,721, describes a fabric used in the manufacture of protective garments, containers and covers comprising an inner layer of a tear resistant, high tensile strength substrate and a film layer comprised of a fusible, meltable, polyhalogenated ethylene resin group bonded on at least one surface of said high modules fabric substrate.

Bartacis discloses multilayer structure in U.S. Pat. No. 4,924,525. This reference describes a multilayer film structure having an inner layer of substantially isotactic oriented polypropylene homopolymer sandwiched between a layer of ethylene-propylene random copolymer and a layer of ethylene-vinyl-acetate. The multilayer film structure is then bonded to a two layer polyester substrate using an elastomeric adhesive. In a preferred embodiment, a barrier material having a layer of ethylene-vinyl alcohol is combined with the multilayer film structure to form a composite, which is then combined with the substrate. Additionally, Adiletta, in U.S. Pat. No. 4,865,903, describes a flexible, impermeable, universally chemically resistant composite structure which may be fabricated into protective clothing. The composite structure comprises a fabric substrate and thermally-melt-bonded on both sides thereof, a coated film, which coated film comprises a PTFE film having a thermoplastic flouropolymer coating on both sides thereof.

Despite the foregoing disclosures, there is still a need for a nuclear, biological and chemical protective material that also serves as a fire-retardant barrier structure that can be used in making fire-retardant protective garments, covers, tents and shelters for personnel, equipment and supplies. There is a need for such a barrier structure also having antistatic properties. The reinforcing fabric substrate will impart the necessary strength to the fire-retardant multilayer barrier film and the resulting laminated composite structure is resistant to NBC agents and burning, or is self-extinguishing, and may also be antistatic. As may be determined from the foregoing composite materials, none provide such a combination of properties.

Accordingly, a principal object of the present invention is a barrier structure which exhibits a high degree of fire-retardant qualities and nuclear, biological and chemical protection.

It is an object of the present invention to provide a material having substantially all of the desired qualities necessary to protect personnel, equipment and supplies from fire, chemical agents and/or biological agents while maintaining its flexibility and printability.

A further object is a barrier structure which is fire-retardant and resists permeation by solids, liquids, gases, and dusts, particularly radioactive dust and liquids.

Another object is a barrier structure which is durable and relatively easily produced on a large scale.

A further object is a barrier structure which is low cost and inexpensively produced by known manufacturing methods.

A further object is a barrier structure which is disposable by military and industry standards.

Still another object of the barrier structure is that it be resistant to degradation caused by environmental factors including exposure to weather, aging and ultraviolet radiation.

Another object is a barrier structure which is versatile light weight, thin gauge, and easily fabricated by known industry methods into protective garments, protective covers, tents, shelters and the like.

A further object is a barrier structure which is soft, flexible and has good drape properties.

Another object is a barrier structure which can be embossed with a variety of patterns for greater softness, flexibility and increased drape properties.

Yet another object is a barrier structure which has a surface embossing pattern designed so that it is like a anti-skid surface when walked on while being covered by liquids, snow and mud.

Still another object is a barrier structure that is useful over a wide range of temperatures.

Yet a further object is a barrier structure which is smooth and low linting.

Another object is a barrier structure which is easily taken on and off when used in a protective garment.

A further object is a barrier structure which low in bulk, easily reduced to a small shape after fabrication, easily packaged and stored in a minimal amount of space.

Yet another object is a barrier structure which is relatively quite to the wearer when moving and easily flexed by the wearer with a minimum amount of energy and with a minimal amount of spring back or memory in the fabric.

Still another object is a barrier structure which is both resistant to chemicals and biological agents and nuclear liquids and dust while exhibiting a high degree of resistance to burning or being self-extinguishing.

Yet another object is a barrier structure which has low reflective qualities to both light and radar illumination in addition to influencing the infrared reflectance to make it relatively indistinguishable from land background.

Another object is a barrier structure which can be easily colored for positive identification of use and to quickly locate it while in use.

Still another object of the present invention is a barrier structure which is antistatic while offering both resistance to nuclear, biological and chemicals, and resistance to burning or being self-extingushing.

SUMMARY OF THE INVENTION

Accordingly, the present invention is directed to a fire-retardant barrier structure capable of resisting chemical and biological agents and nuclear dust while exhibiting a high degree of resistance to burning or being self-extinguishing. The barrier structures of the invention are useful in preparing items such as protective garments, covers, tents and shelters which may be used by military or civilian personnel in situations in which there is susceptibility to chemical and biological warfare agents and dust, in particular nuclear dust, and for industrial chemicals and biological organisms and wherever the danger of fire exists.

The fire-retardant barrier structure has a first component, a multilayer fire-retardant barrier film for resisting chemical and biological agents. The first component also contains a fire-retardant material. The fire-retardant barrier structure also has a second component which imparts strength and reinforcement to the first component and is attached to the first component (the fire-retardant barrier film) by any method of lamination, preferably by adhesive or hot roll, and most preferably by extrusion lamination.

The fire-retardant barrier structure has at least two layers of the first component barrier film containing a fire-retardant material. The fire-retardant barrier structure further may include additional layers in the first and/or second components for: additional chemical/biological barrier resistance, abrasion resistance, increased puncture and tear strength, additional heat sealing strength, color pigments which have low reflective qualities for both light and radar illumination or for influencing the infrared reflectance which make it relatively indistinguishable from land background and for increased (UV) ultra violet light protection for continued long term outdoor exposure.

This invention also pertains to a fire-retardant barrier structure utilizing a nonwoven fabric substrate having a flammability characteristic of less than about 10 seconds based on Federal Test Standard 191A, Method 5903-1 and a normalized breakthrough time and permeation rate is approximated for the liquid chemicals that are listed in Table 1 (shown below) as per the ASTM F739 test method, "Test Method for Resistance of Protective Clothing Materials to Permeation by Liquids and Gases". The above tests are standardized tests accepted by industry, the military and/or US government for evaluating flammability characteristics and resistances to chemical agents.

Other features of the present invention will become apparent from the following detailed description when taken in connection with the accompanying drawings. It is to be understood that the drawings are designed for purposes of illustration only and are not intended as a definition of the limits of the invention.

BRIEF DESCRIPTION OF THE DRAWINGS

The above and other features, objects and advantages of the present invention will be better understood from the following specification when read in conjunction with the accompanying drawings, in which.

DETAILED DESCRIPTION

Figure 1:
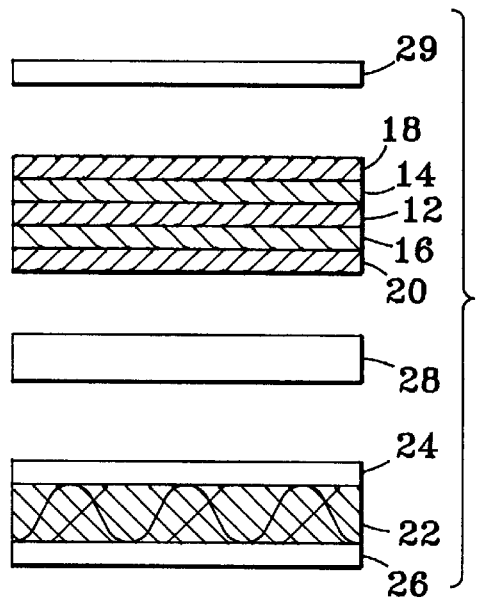
FIG. 1 is an exploded schematic cross-section of a composite fabric embodying the present invention.

The present invention pertains to a fire-retardant barrier structure having a first component, a multilayer fire-retardant barrier film for resisting nuclear, biological and chemical elements and a second component attached to the first component for imparting strength to the fire-retardant barrier. The first component also contains a fire-retardant material. The first layer of the first component may be multilayer itself and at least two layers of the first component contain a fire-retardant material which may be the same or different.

The first component may be any multilayer fire-retardant barrier film capable of resisting nuclear, biological and chemical agents. One such barrier is a three layer coextruded fire-retardant barrier film with the two outermost layers of the same or different composition of materials, each containing the same or different fire-retardant additives with both outer layers surrounding the core layer which is comprised of a barrier resin compound suitable for NBC protection. In the three layer barrier film, the center core layer of the film is comprised of a any barrier material, preferably SARAN® film, which is a copolymer of about 75 to 85% by weight of vinylidene chloride monomer, with vinyl chloride monomer making up substantially the balance of the core which is surrounded by two outer layers comprised of the same or different materials, such as, (EVA) ethyl vinyl acetate copolymer, polypropylene, polyethylene, or a chlorinated polyethylene material blended with 10 to 28% by weight of a fire-retardant material; preferably, 20% of PPG FSP-105 with a low density polyethylene carrier resin. The making of SARAN® films, EVA copolymers, polypropylenes, polyethylenes of various molecular weights and chlorinated polyethylenes are well understood in the art. The layers surrounding core barrier material may also contain anti-block, slip, or filler additives as necessary for processing the barrier film and to get the desired physical properties and burning characteristics. The fire-retardant material can be the same or different and is made of materials as described in the fire-retardant material examples provided. In the preferred three layer film, the fire-retardant is preferably ENDURA® FSP-105 fire-retardant concentrate, available from PPG Industries, Pittsburgh, Pa., or the equivalent, containing about 10 to 30% antimony trioxide and an organic bromine flame retardant compound of about 5 to 50%, by weight, with the balance made up of a polyolefin carrier resin, preferably polyethylene, most preferably a low density polyethylene. In addition, the two outermost layers of the barrier film may also contain (in addition to an EVA) a blend of a polyolefin; preferably polyethylene, and most preferably low density polyethylene. The total thickness of the three layer coextruded film can be between about 0.50 to 4.5 mils thick, with each of the layers proportionate to each other. The production of a coextruded, multiple-layered film of this invention with the core barrier and the attaching layers are well understood art and is described in U.S. Pat. No. 3,557,265.

Other such examples which may be used for the fire-retardant barrier film include the four- and five-layered coextruded modified burn characteristic films, such as SARANEX® films, available from Dow Chemical Company, and described in U.S. Pat. No. 5,250,350; similar constructions, or those in three or more layers using nylon, a nylon-SARAN® film, a nylon-SARAN®-EVOH hybrid film, and ethylene vinyl alcohol (EVOH) films or ethylene vinyl alcohol-SARAN® hybrid films, or polyethylene/nylon/ethylene-vinyl alcohol or combinations thereof may also be used.

The multilayer film contains fire-retardant material in at least two layers. The outer layers being the most preferred in the three layer structure. In the most preferred five layer film, it contains fire-retardant material in both the outer and the inner layers surrounding the core barrier. The fire-retardant may be the same or different in each layer. The five layer film incorporates layers arranged in the following order: low density polyethylene / ethyl vinyl acetate (EVA)/copolymer of vinylidene chloride and vinyl chloride/ethyl vinyl acetate/low density polyethylene. The four layered film includes layers arranged in the following order: low density polyethylene/ethyl vinyl acetate (EVA)/copolymer of vinylidene chloride and vinyl chloride/ethyl vinyl acetate.

These films are described in U.S. Pat. Nos. 3,479,425 and 3,557,265, and the modified burn characteristic SARANEX® films are described in U.S. Pat. No. 5,250,350; the contents of each of these patents being hereby expressly incorporated by reference.

The first component may further include second and third layers on opposite sides of the barrier film. The second or third layers may also contain a fire-retardant material or may be present for imparting various qualities to the first component; e.g. a nonstick surface, a finished surface of a mat, gloss or embossed pattern, for abrasion resistance or color, to increase the thickness and/or the performance qualities of the overall barrier. The fire-retardant material in the second and/or third layers may be the same or different as that in the first component.

The second and third layers of the first component can be made of any material capable of being attached to the first layer and carrying additional reagents if necessary, e.g. fire-retardant materials or pigments. An example of materials useful for the second and third layers of the first component are: the polyolefins, including polyethylene, polypropylene, chlorinated polyethylene, ethylene vinyl acetate, ethylene-acrylic acid polymers such as Primacor® E/C Polymers, available from Dow Chemical Company, or Surlyn® polymers, available from E. I. du Pont de Nemours and Company, and blends thereof, and more particularly, low density polyethylene (LDPE).

The fire-retardant material is a material capable of imparting favorable fire-retardant characteristics or flammability characteristics into a layer of a different material, e.g. reduces or eliminates its tendency to burn. The term fire-retardant material is intended to include single fire-retardant agents, or combinations of other fire-retardant compounds that enhance the performance of fire-retardant agents or combinations thereof. Examples of such fire-retardant materials may include combinations of antimony oxide, antimony trioxide, arsenic, octadecanoic acid, aluminum salt, aluminum tristerate, lead oxide, 1H-isoindole- 1,3(2H)-dione,2,2'-(1,2-ethanediyl) BIS(4,5,6,7-tetrabromo) chlorinated paraffins, halogenated non-metallic elements such as chlorine, fluorine, bromine, astatine, iodine and (NFP) "Nochar's Fire Presenter", available from Nochar, Indianapolis, Ind.

Chemical and biological agents are agents which are used in chemical or biological warfare. Examples of chemical warfare agents include nerve agents such as agent Soman (GD) O-pinacolyl methylphosphonofluoridate, agent (VX) O-ethyl-S-2-(diisopropylaminoethyl) methylphosphonothioate, and agent Sarin (GB) O-isopropylmethylphosphonofluoridate, blistering agents such as Sulfur Mustard (HD) bis(2-chloroethyl) sulfide along with blood agents and choking agents.

Examples of chemicals (agents) commonly found in industrial and hazardous waste environments are found in ASTM F1001 the "Recommended List of Liquid and Gaseous Chemicals for Evaluating Protective Clothing Materials in Testing Programs" the contents of which are hereby expressly incorporated by reference.

Examples of biological warfare agents include toxins, rickettsia, bacteria, and viruses.

Nuclear agents are those agents that can be transported in a solid, liquid or gas form, and to a limited degree, nuclear radiation.

These examples are not intended to be limiting and if first layer is capable of resisting at least one of these agents, then it is intended to be encompassed by the language "resisting nuclear, biological and chemical agents" for purposes of this invention.

The second component attached to the first component includes a substrate of fabric for imparting strength and durability to the fire-retardant barrier making the first component more resistant to tears and puncture. The second layer of the second component may be made up of a multilayer system such as a woven scrim.

In one preferred embodiment where high strength, demanding durability and heavier weight are most suitable for use in military protective clothing, covers, tents shelters a woven scrim is most desirable. The scrim is woven from a high density polyolefin material sandwiched between two layers of low density polyolefin material. The most preferred scrim is woven from high density polyethylene material sandwiched between two layers of low density polyolefin material. At least one of the polyethylene containing layers contains a fire-retardant material, and in a preferred embodiment all of the polyolefin material in the second component, including both high density and low density forms, contain a fire-retardant material. The fire-retardant material may be the same or different in all the layers.

It has been discovered that this technique when applied to nonwoven fabric substrates, produces yet another desirable fire-retardant barrier structure that is lighter in weight, more flexible and lower in cost thus meeting the different requirements and needs of the military and industry. The term "fabric substrate" is herein intended to be a general term encompassing any fabricated natural or synthetic material, whether woven, nonwoven, spunbonded, wet or dry laid, knitted, spunbonded, needled punched, felted, or otherwise constructed. For example, the fabric may be selected from the group consisting of nylon, cotton, polypropylene, PBI, hemp, cellulose, silk, polyester, viscose, asbestos, acrylic, acetate, flax, fiberglass, wool, polyethylene, aramid, rayon, jute, manila, NOMEX® material, and blends thereof.

The fabric substrate may or may not contain a fire-retardant material. The fire-retardant may be the same or different than that in the layers of the first and second components. The fire-retardant can be incorporated into the fiber or yarn of the fabric substrate or it can be applied by spraying (airless), vat dipping or soaking, fogging, curtain coating, brushing or rolling, pressurization.

It has been found in the use of a nonwoven substrate, in most cases, a suitable fire-retardant barrier structure, with acceptable self-extinguishing or fire-retardant qualities and barrier properties can be achieved without providing a top layer over the fire-retardant barrier film or coating on the opposite side of the fabric substrate, thereby significantly lowering cost while still meeting the performance requirements.

Sufficient short term protection against the degradative effects of the environment and sunlight (UV) exposure of the fire-retardant barrier material is afforded by the natural milky color of the fire-retardant in the top and/or inner layer(s) of the barrier film and generally there is no need for additional additives for protection. Where longer protection is desired, it can be achieved by the addition of a suitable color pigment and/or the addition of a UV stabilizer. The color pigment and/or UV stabilizer can be added to any layer of the first component and second component as necessary by weighing the cost-benefit relationship in order to achieve the desired level of protection. While the traditional stabilizers are known to the art, such as absorbers (e.g. benzophenones) or quenchers (e. g. nickel compounds) are satisfactory, the most preferred embodiment use hindered amines, such as TINUVIN® and CHIMASSORB® amines, available from Ciba-Geigy Corporation, Hawthorne, N.Y.

Where maximum UV and environmental protection are desired, the preferred embodiment will utilize these concentrates in about 0.1 to about 0.5 percent concentration, by weight; preferably, a concentration of about 0.25 percent, by weight, is used. The preferred concentrates, TINUVIN® 622 and CHIMASSORB® 944, are used for maintaining the flexibility and cost effectiveness for EVA copolymer and polyolefin layers, in particular polyethylene. In fabric substrates that contain polyolefin oriented slit tapes, TINUVIN® 622 is desired where water carry-over is a factor, TINUVIN® 783 is more desirable where food contact approval in necessary, and where less demanding requirements are needed TINUVIN® 770 is most desirable.

The substrate fabrics that are used in protective garments include nonwoven substrates made of TYVEK® fabrics, available from E. I. du Pont de Nemours and Co., Wilmington, Del., various natural and synthetic fiber nonwovens, such as olefin material fabrics, available from Kimberly Clark Corp., Roswell, Ga., and a variety of polyolefin fabrics including CLAF®, RFX®, fabrics, available from Amaco Inc., Atlanta, Ga., and other natural and synthetic fabric substrates. These fabric types and suppliers are not intended to be limiting, and if the second component is capable of imparting at least an increase in strength and durability over the fire-retardant barrier film, then it is intended to be encompassed by the language "fabric substrate" for purposes of this invention.

The preferred nonwoven fabric substrate for protective garments, covers, tents and shelters is a polyolefin, in particular a nonwoven polyolefin and more preferably a spunbonded olefin of high density polyethylene. Most preferably TYVEK® fabric is used. The unique properties of TYVEK® fabric make it desirable for use as a fabric substrate. The preferred TYVEK® fabric substrates are types 10, 14 and 16; more preferably, types 14 and 16; and most preferably, type 14.

Where particular application requirements demand a smooth, hard, stiff like paper-like substrate, type 10 is preferred. In the more preferred types 14 and 16, the soft, flexible, point bonded, fabric like embossed pattern is preferred; the most preferred being type 14, and more preferably in the type 1422A.

The fabric substrate may be attached to the fire retardant barrier by a number of laminating methods. The methods of attaching the first and second components are arts that are well known in the industry and can be achieved with hot melt, hot roll, coated adhesives, or any combinations thereof or by extrusion coating/lamination. The preferred method of laminating the fabric substrate to the barrier film is by the extrusion process with any material capable of causing a lamination. The preferred material is a polyolefin, and more preferably a polyethylene. The laminating material may or may not contain a fire-retardant material. The most preferred embodiment will contain a fire-retardant additive in the laminating polyolefin, particularly polyethylene, and most, particularly low density polyethylene.

The term "laminate" is used herein to mean a multilayer structure prepared by coating and laminating one or more layers onto a film or fabric substrate.

A flammability characteristic is the ability of the barrier to resist burning or self-extinguish when contacted with a flame for a certain duration of time. The shorter the duration of time for self-extinguishing, the more favorable the flammable characteristic of the barrier. The term "flammability characteristic" for purposes of this invention is interchangeable with "after-flame time".

Federal Test Method Standard 191A, Method 5903-1 is recognized methodology for testing materials for their flammability characteristics. One of ordinary skill in the art would be able to locate the published guidelines for Federal Test Method 5903-1 and test their barrier pursuant to the guidelines to determine the flammability characteristic of various materials. Federal Test Method 5903-1 is an integral part of Federal Test Method Std. No. 191A. The contents of both published guidelines for Federal Test Method Std. No. 191A entitled, Federal Standard for Textile Test Methods 191A, Jul. 20, 1978 and Federal Test Method 5903-1 entitled, Flame Resistance of Cloth: Vertical, Dec. 28, 1989, are hereby expressly incorporated by reference.

The Federal Test Method 5903-1 (hereinafter FTM 5903) is as described below. The method is intended for use in determining the resistance of cloth to flame and glow propagation and tendency to char. FTM 5903 is designated primarily for cellulosic fabrics treated with a flame retardant but it may be used in other applications. In addition, the sample is held in a vertical position and the flame exposure conditions are common to tests of this type. The method further defines gas composition, burner, cabinet, temperature and humidity test conditions since it is designed primarily for inter-laboratory testing of the same material. FTM 5903 is described in detail below under separate heading for purposes of clarity.

Federal Test Method Standard No. 191A Federal Test Method 5903

Test Specimen—The specimen is a rectangle of cloth 2¾ inches (70 mm) by 12 inches (305 mm) with the long dimension parallel to either the warp or filling direction of the cloth. No two warp specimens contain the same warp yarns, and no two filling specimens contain the same filling yarns.

Number of Determinations

Five specimens from each of the warp and filling directions are tested from each sample unit.

Apparatus

Cabinet—A cabinet and accessories, fabricated in accordance with the requirements specified in FIGS. 5903A, B, and C of FTM 5903 are used. Galvanized sheet metal or other suitable metal is used. The entire inside back wall of the cabinet is painted black to facilitate the viewing of the test specimen and pilot flame.

Burner—The burner is equipped with a variable orifice to adjust the flame height, a barrel having a ⅜ inch (10 mm) inside diameter and a pilot light. The burner may be constructed by combining a ⅜ inch (10 mm) inside diameter barrel 3¼ inches (76 6 mm) long from a fixed orifice burner with a base from a variable orifice burner. The pilot light tube has a diameter of approximately 1/16 inch (2 mm) and is spaced ⅛ inch (3 mm) away from the burner edge with a pilot flame ⅛ inch (3 mm) long.

The necessary gas connections and the applicable plumbing are specified in FIG. 5903D of FTM 5903 except that a solenoid valve may be used in lieu of the stopcock valve to which the burner is attached. The stopcock valve or solenoid valve, whichever is used, is capable of being fully opened or fully closed in 0.1 second.

On the side of the barrel of the burner, opposite the pilot light there is a metal rod of approximately ⅛ inch (3 mm) diameter spaced ½ inch (13 mm) from the barrel and extending above the burner. The rod has two 5/16 inch (8 mm) prongs marking the distances of ¾ inch (19 mm) and 1½ inches (38 mm) above the top of the burner. The burner is fixed in a position so that the center of the barrel of the burner is directly below the center of the specimen.

Gas Regulator Valve System—A control valve system with a delivery rate designed to furnish gas to the burner under a pressure of 2½

¼ pounds per square inch (17.2 kPa % 1.7 kPa) at the burner inlet. The manufacturer's recommended delivery rate for the valve system includes the required pressure.

Gas Mixture—A synthetic gas mixture of the following composition is used within the following limits (analyzed at standard conditions): 55% 3 percent hydrogen, 24% 1 percent methane. 3% 1 percent ethane, and 18% 1 percent carbon monoxide, which will give a specific gravity of 0.365 % 0.018 (air=1) and a B.T.U. content of 540% 20 btu's per cubic foot (dry basis) at 70° F. (21° C.).

Stop Watch—A stop watch or other device is used to measure the burning time to 0.2 seconds.

Procedure

The material undergoing the test is evaluated for the flammability characteristic, e.g. after-flame time, afterglow time, on each specimen. All specimens are tested at moisture equilibrium under standard atmospheric conditions in accordance with Section 4 of this Standard. Each specimen is tested by exposing to the test flame within 20 seconds after removal from the standard atmosphere.

The specimen in its holder is suspended vertically in the cabinet in such a manner that the entire length of the specimen is exposed and the lower end is ¾ inch (19 mm) above the top of the gas burner. The apparatus is set up in a draft free area.

Prior to inserting the specimen, the pilot flame is adjusted to approximately ⅛ inch (3 mm) in height measured from its lowest point to the tip. The burner flame is adjusted by means of the needle valve in the base of the burner to give a flame height of 1½ inches (38 mm) with the stopcock fully open and the air supply to the burner shut off and taped. The 1½ inch (38 mm) flame height is obtained by adjusting the valve so that the uppermost portion (tip) of the flame is level with the top of the metal prong (see FIG. 5903B) specified for adjustment of flame height. After inserting the specimen, the stopcock is fully opened, and the burner flame applied vertically at the middle of the lower edge of the specimen for 12 seconds and the burner turned off. The cabinet door remains shut during testing.

The after-flame time is the time the specimen continues to flame after the burner flame is shut off. The after-glow time is the time the specimen continues to glow after it has ceased to flame. If the specimen glows more than 30 seconds, the specimen holder containing the specimen is removed from the cabinet without any unnecessary rate of movement of the specimen which will fan the glow, and suspended in a draft-free area in the same vertical position as in the test cabinet. When more than one glowing specimen is suspended outside the test apparatus, the specimens are spaced at least 6 inches (152 mm) apart. The specimens remain stationary until all glowing has ceased. The glow is not extinguished even when the after-glow time is not being determined.

After each specimen is removed, the test cabinet is cleared of fumes and smoke prior to testing the next specimen.

Results—The after-flame time, after-glow time of the sample unit is the average of the results obtained from the individual specimens tested. All values obtained from the individual specimens are recorded. The after-flame time and after-glow time are reported to the nearest 0.2 second.

The materials of this invention made of woven fabric substrate materials have shown after-flame times of less than 6.0 seconds and after-glow times of 0.0 seconds and a char length of less than 7.5".

The materials of this invention made of nonwoven fabric substrates materials have shown after-flame times of less than 0.0 seconds and after-glow times of 0.0 seconds and a char length of less than 8".

The fire-retardant barrier structures barriers of this invention have a flammability characteristic of less than about 6 seconds based on the Federal Test Method 5903 described above. The flammability characteristic is the same as the after-flame time described above. The barriers of this invention have a flammability characteristics of less than about six seconds preferably down to a time period approaching zero seconds. Presently, the U.S. Army requires a flammability characteristic (after-flame) of six seconds or less for materials used in some military applications.

The materials of this invention have a fire resistance in accordance with this testing standard and are listed in EXAMPLE 1. A comparison is made with similar materials not containing any fire-retardant materials, that is those materials identified as SARANEX®/TYVEK® Laminate and the fire-retardant barrier structure of this invention. The examples listed in EXAMPLE 1 are intended to be illustrative and not be limiting upon the scope of the invention.

EXAMPLE 1

A five layer 2 mil and 4 mil coextruded modified burn characteristic SARANEX® film were extrusion laminated with a 1.5 mil low density polyethylene extrudate containing 20% by weight of PPG FSP105 fire-retardant to the nonwoven fabric substrate, TYVEK® fabric type 1422A, approximately 5 mils thick.

| PROPERTY | NON FIRE RETARDANT SARANEX®/TYVEK® | FIRE RETARDANT BARRIER STRUCTURE |
|---|---|---|
| Thickness | 8 mils | 8 mils and 10 mils |
| Burning Behavior | Consumed | Self-Extinguished |
| After-flame FTMS-191-5903 | 33 seconds | 0.0 seconds |

COMPARISON OF SARANEX/TYVEK FLAMMABILITY WITH FIRE RETARDANT BARRIER STRUCTURE

Permeation resistance to such liquid chemicals is measured using the methodology described in ASTM F739-91 "Standard test Method for Resistance of Protective Clothing to Permeation by Liquids or Gases under Conditions of Continuous Contact", the contents of which are hereby expressly incorporated by reference. The methodology of ASTM F739-91 is art recognized and available to the public, the contents of the method identified is hereby expressly incorporated by reference. One of ordinary skill in the art would know how to conduct such tests on the material of the present invention after reading the published guidelines.

The materials of this invention have a chemical resistance in accordance with this testing standard and are listed in EXAMPLE 2. A comparison is made with similar materials not containing any fire-retardant materials, that is those materials identified as SARANEX®/TYVEK® Laminate and the fire-retardant barrier structure of this invention. The examples listed in EXAMPLE 2 are intended to be illustrative and not be limiting upon the scope of the invention.

EXAMPLE 2

A five layer 4 mil coextruded modified burn characteristic SARANEX® film was extrusion laminated with a 1.5 mil low density polyethylene extrudate containing 20% by weight of PPG FSP105 fire-retardant to the nonwoven fabric substrate, TYVEK® fabric type 1422A.

COMPARISON OF CHEMICAL RESISTANCE OF SARANEX/TYVEK LAMINATE WITH FIRE RETARDANT BARRIER STRUCTURE

| CHEMICAL (LIQUID) PERMEATION | SARANEX®/TYVEK®[1] | | FIRE RETARDANT BARRIER[2] | |
|---|---|---|---|---|
| | BREAK-THROUGH TIME (min) | PERMEATION RATE ($\mu g/cm^2 min$) | BREAK-THROUGH TIME (min) | PERMEATION RATE ($\mu g/cm^2 min$) |
| ACETONE | 24 | 1.6 | 211 | .03 |
| ACETO-NITRILE | 13 | 2.8 | >480 | ND[3] |
| CARBON DISULFIDE | 8 | >50 | 5 | 84 |
| DICHLORO-METHANE | 7 | >50 | 9 | 8.3 |
| DIETHYL-AMINE | 12 | >50 | 45 | 7.0 |
| DIMETHYL-FORMAMIDE | 113 | 0.4 | >480 | ND |
| ETHYL | 36 | 6.6 | 68 | 1.1 |

-continued

COMPARISON OF CHEMICAL RESISTANCE OF
SARANEX/TYVEK LAMINATE WITH
FIRE RETARDANT BARRIER STRUCTURE

| | SARANEX ®/ TYVEK ®[1] | | FIRE RETARDANT BARRIER[2] | |
|---|---|---|---|---|
| CHEMICAL (LIQUID) PERMEATION | BREAK-THROUGH TIME (min) | PERMEATION RATE ($\mu g/cm^2 min$) | BREAK-THROUGH TIME (min) | PERMEATION RATE ($\mu g/cm^2 min$) |
| ACETATE N-HEXANE | 146 | 0.48 | >480 | ND |
| METHANOL | >480 | ND | >480 | ND |
| NITRO-BENZENE | 102 | 2.3 | 188 | 3.1 |
| SODIUM HYDROXIDE 50% Concentrate | >480 | ND | >480 | ND |
| SULFURIC ACID Concentrate | >480 | ND | >480 | ND |
| TETRA-CHLORO ETHYLENE | 8 | 5.7 | 59 | 0.96 |
| TETRA-HYDROFURAN | Immediate | >50 | 8 | 18 |
| TOLUENE | Immediate | 30 | 22 | 5.0 |

[1]SARANEX ®/TYVEK ® data taken from May 1994 Permeation guide for du Pont Tychem Fabrics.
[2]Data reported for fire-retardant barrier structure are averaged normalized breakthrough time and average permeation rate.
[3]ND = None Detected Resistance to mustard and thickened GD toxicological agents is the ability of a material to resist passage of such agents from one side of the material to the other or allow eventual permeation of such agents at a slow rate.

The resistance to such toxicological agents is measured using the methodology described in Chemical Research and Development Center -Special Procedure -84010 (CRDC-SP-84010). This is an unpublished procedure, the contents of which are hereby expressly incorporated by reference. One of ordinary skill in the art would be able to determine this value by submitting their material to the Chemical Research and Development Center and having them conduct the appropriate test and rendering the results. From the limited published literature related to CRDC-SP-84010, it is determined that the resistance to permeation by mustard (HD) is determined by applying the chemical agent to the film surface in droplets at a concentration of 10 grams per square meter. Test specimens are obtained by cutting two, two inch diameter circular specimens from each sample with one determination made on the back side of each specimen. No test specimen is taken within two inches of the salvage edge. In the event that one of the two tested specimen meets the requirements of the government but the other does not, two additional test specimens are tested. The thickened (GD) toxicological agent is also applied to the material in droplets in a concentration of ten grams per square meter and the specimen is cut as described above from mustard.

The fire-retardant barrier structure made a fabric substrate of the present invention have a resistance to mustard and thickened GD toxicological agents of at least about four hours up to at least about seventy-two hours based on the CRDC-SP-84010 methodology. The resistance may be at least about twenty-four hours, preferably at least seventy-two hours. Presently, the government is requiring a resistance to mustard and thickened GD toxicological agents of seventy-two hours as an acceptable standard for material being used under some chemical/biological warfare conditions.

This invention also pertains to a multilaminate barrier having a flammability characteristic of less than sixty seconds based on Federal Test Method 5903, as described above, and a resistance to mustard and thickening toxicological agents of at least about one hundred minutes based on the methodology described in IAW Military Standard -282, the contents of which are hereby expressly incorporated by reference. The materials of this invention have a resistance under IAW Military Standard - 282 of at least at least about 100 minutes, preferably at least about 240 minutes.

The methodology of IAW Military Standard -282, methods 204.1.1 and 206.11 are art recognized and available to the public, the contents of both the military standard method and the related methods identified are hereby expressly incorporated by reference. One of ordinary skill in the art would know how to conduct such tests on the material of the present invention after reading the published guidelines.

In the preferred original embodiment of woven fabric substrate, the present invention involves a combination of two basic components. The first component is a modified burn coextruded four or five layered SARANEX® film. Basically, the modification involves adding a fire-retardant material such as a polymer of antimony trioxide with an organic bromine to the EVA/low-density polyethylene layers which normally constitute the outer sandwiching layers of the SARAN® core barrier of the SARANEX® film. A further layer of low-density polyethylene may be added to one side of the modified SARANEX® film before or preferably after the barrier film is combined with the second component to serve one or more purposes such as increasing abrasion resistance, carrying pigment or other additives to give desired coloration reflection characteristics or resistance to ultraviolet radiation or to serve as a printing surface for such purposes as camouflage or any of the earlier described benefits.

The second basic component of the woven fabric substrate barrier structure includes a layer of scrim woven from narrow tapes of high density polyethylene material in which the fire-retardant has been incorporated. The layer of scrim is then coated on both sides with molten layers of low density polyethylene material which also incorporates fire-retardant additives. Finally, the two basic components are joined to form the fire-retardant barrier structure of the invention.

In a preferred nonwoven fabric substrate embodiment, the present invention again involves a combination of two basic components. The first component is a modified burn coextruded four or five layered SARANEX® film. Basically, the modification involves adding a fire-retardant material such as a polymer of antimony trioxide with organic bromine to the EVA/low-density polyethylene layers which normally constitute the outer sandwiching layers of the SARAN® core barrier of the SARANEX® film. A further layer of low-density polyethylene may be added to one side of the modified SARANEX® film before or preferably after the barrier film is laminated with the second component to serve one or more purposes such as increasing abrasion resistance, carrying pigment or other additives to give desired coloration reflection characteristics or resistance to ultraviolet radiation or to serve as a printing surface for such purposes as camouflage or any of the earlier described benefits.

The second basic component of the preferred nonwoven fabric substrate embodiment of the fire-retardant barrier structure includes a layer of fabric material which has been made into a nonwoven fabric in continuous roll form, preferably TYVEK® fabric 1422A. The layer of TYVEK® fabric 1422A is then coated on one side with a molten layer of low density polyethylene which contains fire-retardant materials. During this coating process, the first component is introduced to the molten polymer creating a sandwich of layers and then all the components pass through a set of pressure and cooling rollers that cause the materials to fuse together to form the fire-retardant barrier structure of this invention that is most suitable for light weight, protective garments, covers, tents and shelters.

In the most preferred alternate embodiment of the fire-retardant barrier structure, a three layer fire-retardant barrier film is used in place of the four, five or more layered hybrid barrier films. Basically the film's center core is comprised of a any barrier material, preferably SARAN® film, which is a copolymer of about 75 to 85% by weight of vinylidene chloride monomer and vinyl chloride monomer making up substantially the balance of the core which is surrounded by two outer layers which can be comprised of the same or different materials, such as, (EVA) ethyl vinyl acetate copolymer, polyethylene, or a chlorinated polyethylene material blended with 10 to 28% by weight of a fire-retardant material, preferably 20% of PPG FSP-105 with a polyethylene carrier resin, preferably low density.

In the upper part of FIG. 1, there is shown a first basic component made of SARANEX® film modified in accordance with the present invention. As has been noted, conventional unmodified SARANEX® film is composed of a layer of high-barrier resin such as SARAN® film sandwiched between outer layers of polyolefin resins. The high-barrier resin is a copolymer of vinylidene chloride/vinyl chloride which may or may not contain other additives and the outer layers are typically composed of low-density polyethylene.

The embodiment of FIG. 1, however, includes four- or five-layer fire-retardant barrier film comprised of a SARAN® high barrier resin core layer 12 approximately 0.25 (¼) mil in thickness sandwiched between outer adhesive layers 14 and 16, generally comprised of EVA, which may also be about 0.20 (⅕) mil in thickness. To the top of the sandwich, an upper layer 18 of low density polyethylene of about 0.675 (⅔) mil in thickness is applied, and at the bottom of the sandwich a similar lower layer 20 of low-density polyethylene of about 0.675 mil thickness is applied. All of the layers surrounding the core barrier layer may contain fire-retardant which may be the same or different. The layers surrounding the barrier core of the first basic component incorporate about 10–30% fire-retardant material as a constituent, preferably 20%, and the top layer may further include pigments for color, ultraviolet resistant additives and have a mat finish. Another additive may be included for the purposes of influencing the infrared reflectance. In the alternate four layer fire-retardant barrier film, layer 20 is eliminated while increasing layer 16 by 0.675 mil and by increasing layer 18 to a thickness of 1.25 mil which now may contain an optional majority blend of chlorinated polyethylene. The total thickness will range from 2 to 4 mil.

Figure 1A:
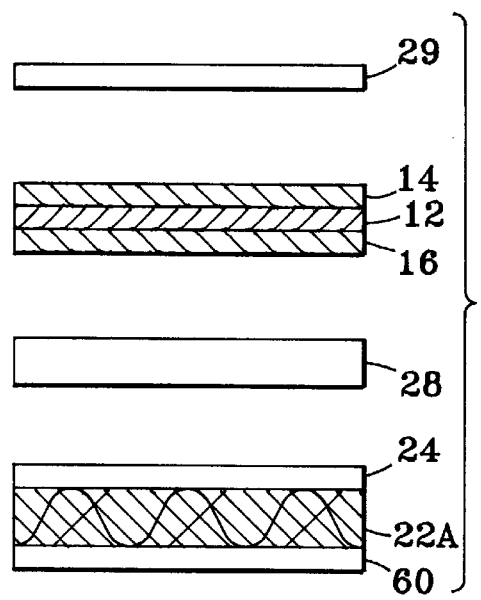
FIG. 1A is an exploded schematic cross-section of an alternate composite fabric embodying the present invention.

Alternatively, in the most preferred embodiment, the three layer fire-retardant barrier film is utilized. FIG. 1A, is modified so that the SARAN® high barrier resin layer 12 approximately 0.25 (¼) mil in thickness is sandwiched between outer adhesive layers 14 and 16 which may also be about 0.875 (⅞) mil in thickness and may be comprised of an EVA, polyolefin, particularly polyethylene, and most preferably low density polyethylene. Layers 14 and 16 may be the same or different in both composition and fire-retardant materials. Layers 14 and 16 are both external layers of the three layered first basic component and have incorporated about 10–30% fire-retardant material, such as PPG FSP 105, preferably 20% by weight as a constituent, and the top layer may further include pigments for color, ultraviolet resistant additives and have a mat finish. Another additive may be included for the purposes of influencing the infrared reflectance. The total thickness will range from 0.5 to 4.5 mil with the ratio between the layers being proportionate.

Alternatively, yet another layer 29 of olefin material, preferably polyethylene of 0.50 to 2.0 mils in thickness may be laminated to the upper layer of the barrier film 18 in FIG. 1 or 14 in FIG. 1A for even greater abrasion or NBC resistance, the carrying pigment or other additives to give desired coloration and reflection characteristics or resistance to ultraviolet radiation or to serve as a printing surface for such purposes as camouflage or any of the earlier described betterments. In the preferred embodiment for protective garments, layer 29 may be omitted from the process where there is no need for these additional qualities. The total thickness of the first component may be from about one to seven mils.

The second basic component of the structure that is shown in the lower part of FIG. 1 and FIG. 1A. FIG. 1 includes a fabric substrate 22 in the form of a layer of scrim of about 3.0 mils in thickness. The scrim is woven from yarn or narrow tapes of a polyolefin material, preferably high-density polyethylene material (HDPE) approximately 1.5 mils in thickness which also incorporated 0.5–10% fire-retardant material in both the warp and the ±2 fill. The scrim may be of 950±50 denier of about 10×10±2 count with no color added.

Alternatively, FIG. 1A includes the most preferred fabric substrate 22A for protective garments in the form of a light weight, fine fiber, olefin spunbonded into a multilayered nonwoven fabric substrate, for example TYVEK® fabric style # 1422A. The typical thickness of the TYVEK® fabric 1422A substrate is 4.75 mils and basis weight is under 2.0 oz. per square yard.

In FIG. 1 the coatings or lamination of layers 24 and 26 comprised of low density polyethylene material each of about 0.50 to 2 mils in thickness are bonded to the upper and lower fabric substrate surfaces respectively. The coating 24, especially when serving as an adhesive layer for attaching the fabric substrate second component 22 or 22A to the barrier first component 12-14-16-18-20 in FIG. 1 or 12-14-16 in FIG. 1A. In such case the later-described additional adhesive layer 28 clearly need not be employed. In the coating layers 24 and 26, there is also included 10–30% fire-retardant material, preferably 20% by weight, PPG FSP 105.

Alternatively, as shown in FIG. 1A, an antistatic coating layer 60 can be added to the fabric substrate 22A.

For applications where a fire-retardant and an antistatic barrier structure is desired for protective garment, shelter, or packaging material, additional processing will be necessary. Most typically, this processing step will be completed after the fire-retardant barrier structure is made into a completed, finished, continuous roll. For example, the finished roll of fire-retardant barrier structure can be coated with an anti-static formulation, known to those skilled in the art, and be radiation cured, as described by Keough, in U.S. Pat. No. 4,623,594, the contents of which are incorporated herein by reference. While the antistatic coating can be applied to either side of the laminated fire-retardant barrier structure, the preferred method is on the fabric substrate side of the structure (as shown in FIG. 1A layer 60)). The clear, antistatic coating will impart into the barrier structure a surface resistivity in a range of between about $1 \times 10^9$ to $1 \times 10^{10}$ ohms/square as measured by ASTM D-257 and a static decay rate of the <0.07 seconds as per FTMS 101C, method 4046.1. The resulting antistatic fabric is non-humidity dependent.

In FIGS. 1 and 1A the two primary components are joined together to form the composite barrier fabric. Several methods of joining the layers are practical. For example, the films may be sealed together without adhesive by bringing the layers to a softening point and passing them between pressure rolls. To achieve a successful bond, the heat, pressure, and dwell time must be adjusted in accordance with the type and thickness of the film materials. The lamination bond can be by point or area. Ultrasonic attachment can also be used.

Alternatively, an adhesive coating or layer 28 may be used between components, and laminated by any of the known methods of laminating such as, hot air, flame, hot melt, point contact, powdered adhesive including but not limited to an adhesive activated by a suitable hot roll.

Figure 2:
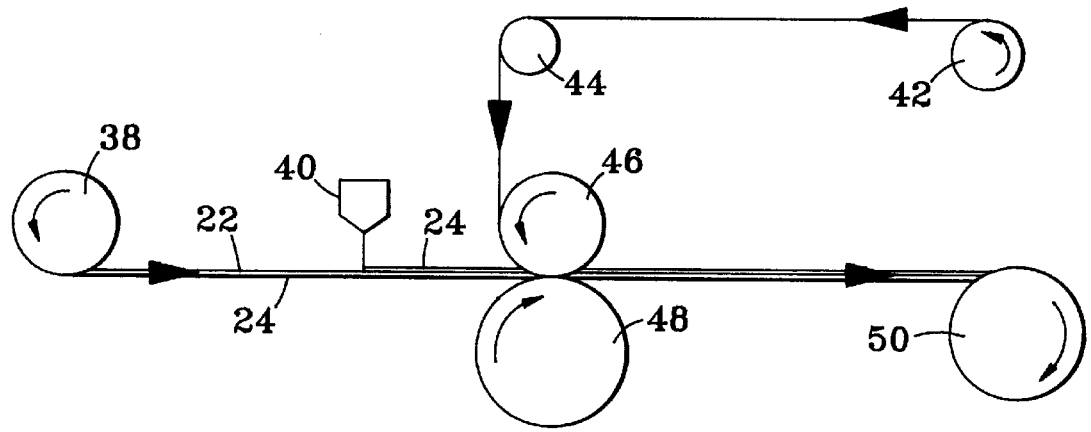
FIG. 2 illustrates one process step in making the composite fabric of the invention.

FIG. 2 illustrates the first step in the process which is attaching the first component, the fire-retardant barrier film to the second component, the fabric substrate. The fabric substrate from the reel 38 with the uncoated side facing upwardly and is passed beneath the extruder die 40, at which point a layer of low density polyethylene material also with added fire resistant material is deposited to a depth of about 1–2 mil. Any acceptable fire-retardant barrier film, such as shown in FIGS. 1 and 1A, and for this example, the modified burn SARANEX® film from reel 42 is unwound in a right-to-left direction about an idler roll 44 to be joined with the fabric substrate as both components are passed between a nip roll 48 and a chill roll 46. The nip roll is TEFLON® material coated. The chill roll may have a surface which produces a smooth, mat and/or an embossed finish. The type of surface on the newly coated laminated barrier film is determined by the surface design on the chill roll. Alternatively, additional barriers can be added to the structure by repeating the laminating procedure. The fire-retardant barrier film component from the reel 42 may include color and/or UV infrared reflectance additives as well as fire resistant material. The composite product emerges from the rolls chill roll 46 and nip roll 48 and is taken up on a wind-up reel 50.

Figure 3:
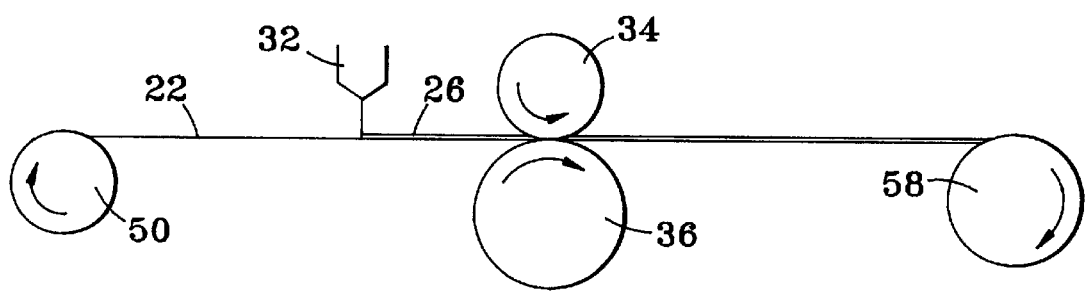
FIG. 3 similarly shows another alternate process of making the composite fabric.

Alternatively, FIG. 3, illustrates schematically the equipment for conducting the necessary steps in coating the fabric substrate when product performance and/or specifications require additional layers or coatings. A roll of laminated fabric substrate material is carried on the reel 50. The fabric substrate material is passed from the supply reel under an extruder die 32, from which a layer 26 of low density polyethylene material is deposited upon the uncoated side of the fabric substrate material to a thickness of 0.5 to 2.0 mils. The deposited layer may contain fire resistant material as well as other additives if desired. As the fabric substrate material continues from left to right as shown in the drawing, it passes between a nip roll 36 and a chill roll 34. The nip roll is TEFLON® material coated. The chill roll may have a surface which produces a smooth, mat and/or an embossed finish. The type of surface on the newly coated side 26 is determined by the surface design on the chill roll. The roll of coated fabric substrate is then accumulated on a wind-up roll 58. Additional coatings can be applied to any surface of the barrier structure by repeating this process while facing the side to be coated upwardly toward the die 32. Where lighter weight and lower cost structures are desired, the complete step identified in FIG. 3 can be eliminated.

The laminating and coating material may also contain color concentrates, radar illuminating compounds, stabilizers, fillers, anti-oxidants, anti-slip, anti-blocking agents and the like. By way of example, the chemical composition of one of the layers used is (in percentages):

| WITH COLOR | WITHOUT COLOR |
|---|---|
| 74.6 LDPE Virgin Resin | 80.0 LDPE Virgin Resin |
| 5.4 Color Pigment | |
| 20.0 Fire Retardant | 20.0 Fire Retardant |

The LDPE should be an extrusion grade resin, such as that available as Eastman Kodak #808P, or Southern Petro NA 203. The melt index may be varied, but one of about 7 is preferred. The color pigment may be AMPACET LD 0925, and the fire-retardant may be PPG #FSPE 105 or equivalent materials.

The various examples and processes described above have in common the incorporation of a highly loaded fire-retardant material of antimony oxide with an activated brominated flame retardent in the low density polyethylene layers which serve as the laminating and outer layers of the fire-retardant barrier structure. The modified burn characteristic SARANEX® film has in common in its glue and outer layers an equivalent fire-retardant material of polyhalogenated organic/ antimony oxide composition. In most instances, it is desirable that a fire-retardant material also be incorporated in various other polyethylene layers as well as some of the fabric substrate material.

However, it is the barrier films' unique fire-retardant characteristics as described in the modified burn SARANEX® three-layer, multilayered hybrid films, and its combination with the fabric substrate along with the fire-retardant constituents which contribute greatly to the fire-retardant, nuclear, biological and chemical barrier qualities in the ultimate barrier product. Thus, the present invention should not be limited to precise details of the examples or processes, but only by the spirit and scope of the appended claims.

What is claimed is:

1. A fire-retardant flexible protective clothing barrier, comprising:
   a first film component including a plurality of flexible layers containing an intermediate core layer of polymeric material serving as a chemical barrier and sandwiched between inner and outer bounding polymer layers containing fire-retardant material; and
   a second component attached to the first component and including a fiber fabric substrate layer for imparting strength to the fire-retardant barrier and having inner and outer surfaces, the inner surface of which is attached to the inner bounding layers of the first film component, the attachment being effected by an interposed bonding adhesion layer and also containing fire-retardant material.

2. The fire-retardant barrier structure as claimed in claim 1, wherein the structure further comprises an external antistatic coating.

3. The fire-retardant barrier structure as claimed in claim 2, wherein the antistatic coating mixture is a quartenary ammonium compound.

4. The fire-retardant barrier structure as claimed in claim 2, wherein said antistatic coating is applied on the exposed surface of said fabric substrate material layer.

5. A fire-retardant barrier as claimed in claim 1 wherein said fabric substrate layer is selected from the group consisting of: nylon, cotton, viscose, wool, rayon, jute, silk, polyester, polyethylene, asbestos, acrylic, hemp, fiberglass, polypropylene, aramid, acetate, cellulose, PBI, and blends thereof.

6. A fire-retardant barrier as claimed in claim 1 and in which the attachment layer is an extruded coating lamination.

7. A fire-retardant barrier as claimed in claim 1 or claim 6 and in which the fabric substrate layer is a high density polyethelene non-woven fabric.

8. A fire retardant barrier as claimed in claim 1 and in which the intermediate polymeric material chemical barrier layer is of a type to which it is difficult to bond other materials, and the inner and outer bounding polymer layers are laminated with the barrier layer to provide external surfaces for the first component that are bondable with the fabric-containing second component.

9. A fire retardant barrier as claimed in claim 8 and in which the bounding polymer layers are co-extruded with the barrier layer and are formed with fire-retardant material therein during the polymerization of the bonding layers.

10. A fire-retardant barrier as claimed in claim 1 and in which said outer surface of the fabric substrate layer is provided with a coating sufficiently conductive to impart antistatic properties to such outer surface.

11. A fire-retardant barrier as claimed in claim 10 wherein the conductivity of the coating lies substantially between $1\times10^9$ to $1\times10^{11}$ ohms/square as measured by ASTM D-257 standards.

12. A fire-retardant barrier as claimed in claim 1 and in which the inner and outer bounding polymer layers are of low density polymeric material formed with fire-retardant material.

13. A fire-retardant barrier as claimed in claim 12 and in which the low density polymeric material is low density polyethylene.

14. A fire-retardant barrier as claimed in claim 1 and in which the fiber fabric substrate is one of natural and synthetic woven and non-woven fibers.

15. A fire-retardant barrier as claimed in claim 8 and in which the chemical barrier layer is of polyvinylidene chloride.

16. A fire-retardant clothing barrier as claimed in claim 14 and in which the thickness of the first component is of the order of up to about the order of 4 mils, and that of the fabric second component, about the order of 5.3 mils.

17. A fire-retardant clothing barrier as claimed in claim 8 and in which the first component inner and outer bounding layers are polyolefin layers selected from the group consisting of low density polyethylene, ethyl vinyl acetate copolymers, polypropylene, chlorinated polyethylene, ethylene vinyl acetate, and ethylene acrylic acid polymers, all blended with fire retardant.

18. A fire-retardant clothing barrier as claimed in claim 8 and in which one or more of the first and second component layers is pigmented to provide color to the clothing.

19. A fire retardant clothing barrier as claimed in claim 8 and in which bonding adhesion between the first film component inner bounding layer and said inner surface of the fabric substrate of the second component is effected by melting the adhering layer(s).

20. A fire retardant clothing barrier as claimed in claim 8 and in which bonding adhesion between the first film component inner bounding layer and said inner surface of the fabric substrate of the second component is effected by an interposed adhesive.

* * * * *